United States Patent

[11] 3,534,672

[72] Inventor Shigeo Ono
 Yokohama-shi, Japan
[21] Appl. No. 628,765
[22] Filed April 5, 1967
[45] Patented Oct. 20, 1970
[73] Assignee Nippon Kogaku K. K.
 Tokyo, Japan
 a corporation of Japan
[32] Priority April 15, 1966
[33] Japan
[31] (utility model), 41/34,937, (utility model) 41/34,938

[54] DEVICE FOR CORRECTING PARALLAX AND THE ANGLE OF VIEW OF THE REAL IMAGE MAGNIFYING TYPE RANGE FINDER
4 Claims, 10 Drawing Figs.

[52] U.S. Cl. ........................................................ 95/44
[51] Int. Cl. ................................................... G03b 13/14
[50] Field of Search .......................................... 95/44

[56] References Cited
UNITED STATES PATENTS
2,805,608 9/1957 Leitz ............................ 95/44C
2,900,887 8/1959 Nerwin ......................... 95/44C Primary Examiner—John M. Horan
Attorney—Anton J. Wille ABSTRACT: In a camera, two movable confrontingly facing masks are provided on a base plate positioned at the focussing plane of the viewfinder objective lens so as to compensate for the change of the viewing field due to the different focal lengths of the interchangeable lenses.

DEVICE FOR CORRECTING PARALLAX AND THE ANGLE OF VIEW OF THE REAL IMAGE MAGNIFYING TYPE RANGE FINDER

The present invention relates to an improved device for correcting parallax and the angle of view of the real image magnifying type range finder.

According to the present invention, there is provided a real image magnifying rangefinder, in which the view mask is formed by two movable masks, and the finder magnification is changed according to the change of the focal length of the mounted lens, and simultaneously the size of the view mask is changed by moving the two movable masks. To correct for parallax and the angle of view, one of the two movable masks is moved.

In a camera view finder, there has already been known such a finder according to which the size of the moving mask on an image-forming surface is changed in the interlocking relation with a magnifying mechanism so as to be used for an interchangeable lens having various kinds of focal lengths within the range beyond the magnification. In such a finder as mentioned above in order to correct parallax and the angle of view by the axial movement of the camera lens it is necessary to give the correction in accordance with the magnification of the finders. The correction mechanism for that purpose is very complex.

It is therefore the object of the present invention to provide an improved simple structure to carry out the above given purpose.

The above object and other objects of the present invention and the advantages thereof are fully described hereinafter referring to the drawing showing an embodiment of the present invention in which.

Figure 3A:
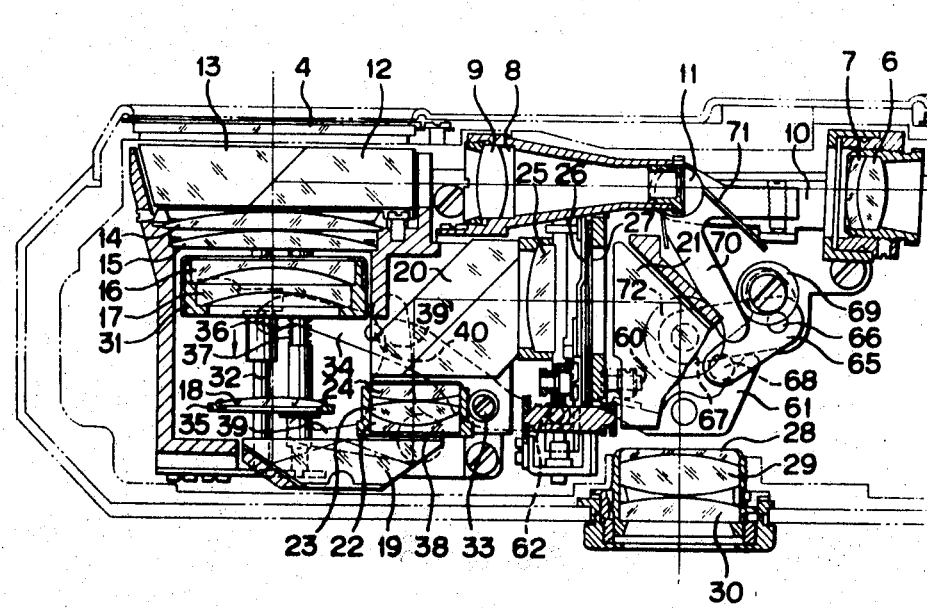
FIG. 3A is a cross-sectional plan view of the range finder as viewed from the top of the camera.
Figure 3B:
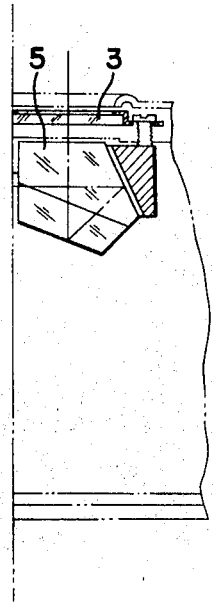
FIG. 3B is a cross-sectional view of the rangefinder viewing aperture.

In the drawing, reference character 1 designates a camera body, 2 is a mount portion for a camera lens which is moved in the direction of the light axis at the time of focussing and reference characters 3 and 4 are the window glasses. Member 5 (FIG. 3B) is a pentaprism for the rangefinder and is provided adjustably on the camera fixed portion. Reference characters 6, 7, 8 and 9 represent a telescope system for the rangefinder, whereby the distance can be measured by moving a distance measuring lever 10 round a shaft 11. Elements 12 and 13 are the double-image coincidence prism. Elements 14, 15, 16, 17 and 18 are a magnifying optical system, and elements 19, 20 and 21 are the prisms for erection. Members 22, 23, and 24 are the image-forming lenses, and member 25 is a view lens. Reference characters 26, 27 designate the moving masks which are operated in cooperation with each other to determine the size of the view mask, and elements 28, 29 and 30 comprise the eyepiece assembly. The magnifying system is movable so that the lenses 16 and 17 are moved by a spring (not shown) in the direction of the arrow (FIG. 3A) together the rod-like guide 32 along with the frame 31 supporting lenses 16 and 17. One end of the frame 31 abuts the pin 40 on the lever 34 which is rotatable around the shaft 33. On the other hand, the lens 18 is movable in the direction as is shown by an arrow by means of the spring 37. The lens 18 moves along the rod-like guide 36 together with the frame 35 and abuts one end of the lever 39 which is rotatable around the shaft 38. The cam portion 39' of the lever 39 contacts the pin 40 on the lever 34, and therefore when the lever 34 is rotated and the lenses 16, 17 are moved the lever 39 is also rotated to move the lens 18 in a predetermined relation with the lenses 16, and 17.

The lever 41 shown in (FIG. 2) is rotatable together with the lever 34 since they have a common shaft 33. Element 42 is a dial for setting up the viewing range and is provided on the upper surface of the camera. The movement of the dial 42 is transmitted to the lever 41 through the cam 43 for moving masks. This movement also adjusts the magnification which is coupled to said dial 42, and which controls the magnifying system through the levers 34 and 39, and the pin 40.

Figure 4:
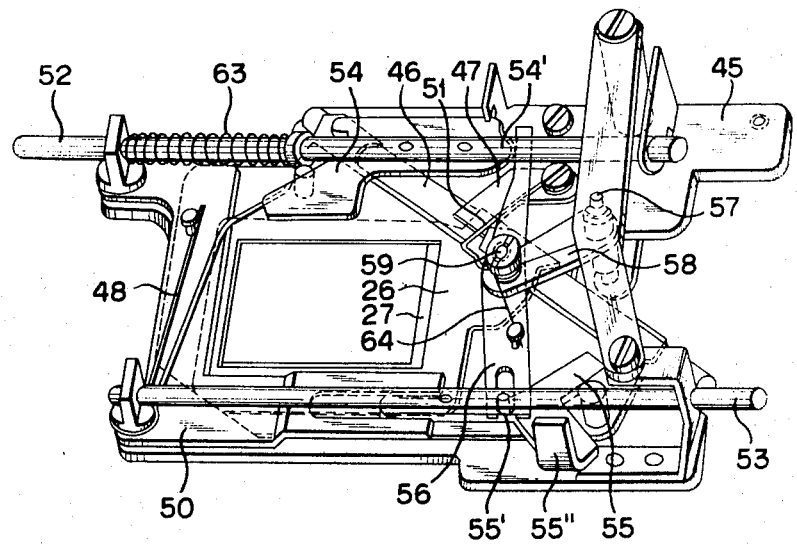
FIG. 4 is a perspective view of the driving portion of the view mask.
Figure 5:
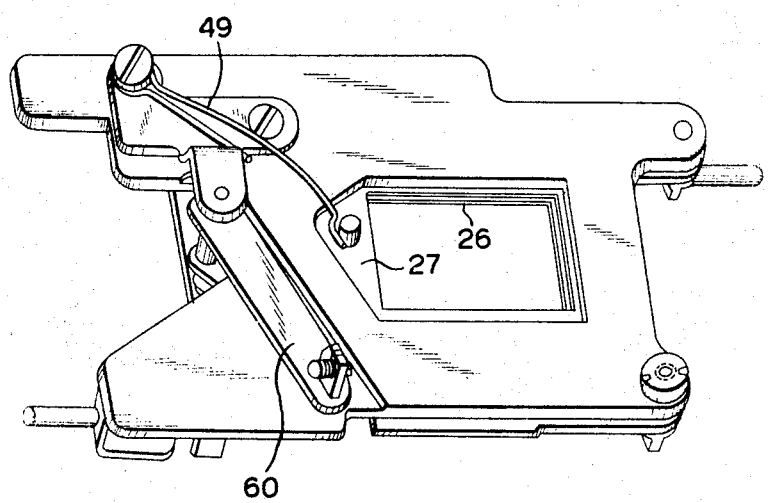
FIG. 5 is a perspective view as observed from behind the view of FIG. 4.
Figure 6:
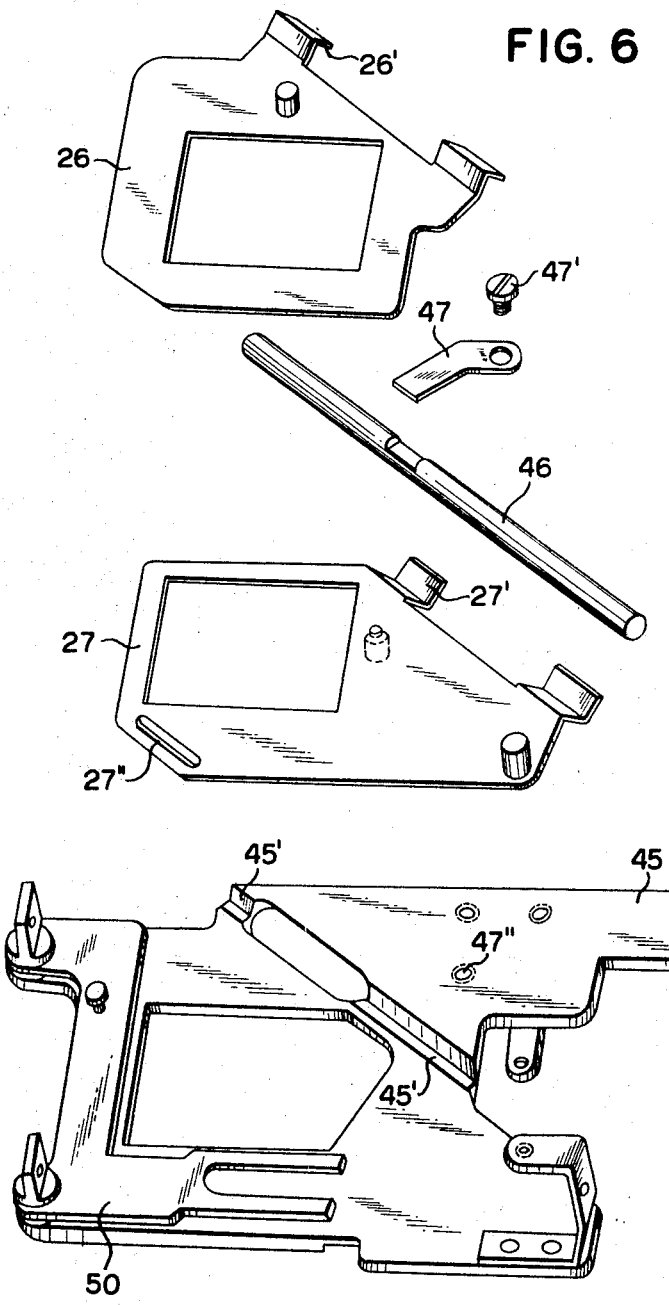
FIG. 6 is an exploded perspective view of a portion of FIG. 4 structure disassembled.
Figure 7:
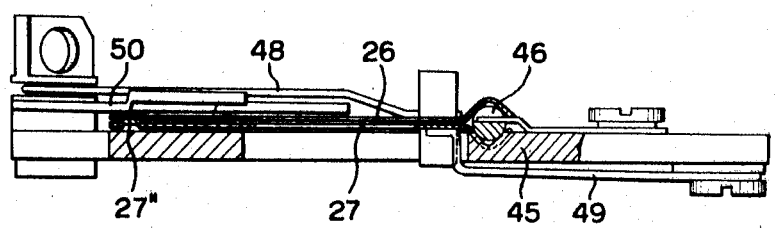
FIG. 7 is a cross-sectional elevational view of the guide bar.

On the other hand, the moving masks 26 and 27 are arranged so as to be diagonally moved relative to the base plate 45 as is shown in FIG. 4, and this is explained more in detail in the following paragraphs. as As is shown in FIG. 6, the V-shaped groove 45' is provided in the direction in which the masks 26 and 27 are moved. On said V-shaped groove 45' the guide rod 46 having partial cut or flatted portion is placed and is fixed by means of the spring plate 47 which is fixed to the plate 45 by a screw 47' threaded into a hole 47". The moving masks 26, 27 are provided so as to have their respective V-shaped grooves 26', and 27' capture said guide rod 46 from above and below. The driving springs 48 (FIG. 4) and 49 (FIG. 5) press grooves 26' and 27', respectively, against the guide rod 46 to the right or towards the center of view. The set position of the guide rod 46 is selected approximately to be the direction (generally almost diagonally) which can satisfy the direction of the vector sum of $x_1$, i.e. an amount of the correction of parallax which is described hereinafter, and $x_2$, i.e. an amount of angle of view, and the direction (generally diagonally), in which size of the mask is changed in the interlocking relation with the magnifying system. As shown in FIG. 7 one end of each of the moving masks 26, 27 is in between the base plate 45 and the pressing plate 50. In order to prevent the close contact of two moving masks 26, the projection 27" is formed on one 27" of the masks. A spring 51 for preventing floating may be provided but sometimes it can be omitted. Thereby, the moving masks 26, 27 can be provided within a narrow space, and at the same time the play of the masks is eliminated. On the other hand, the operational point of the spring is provided in the neighborhood of the guide rod, and therefore the efficiency of driving thereof is remarkably excellent. The position of the moving masks 26, 27 can be determined by the cam plates 54, 55 that are fixed on the rod-like guides 52, 53 which are arranged to be moved in the right and left directions. The movement of the cam plates 54, 55 can be controlled by means of the moving lever 56 which engages the cam plates at the portions 54' and 55', respectively. Said moving lever 56 is rotatably supported on the shaft 59 that is positioned at one end of the lever 58. A shaft 57 fixedly supports the lever 58, and is interlocked to the intermediate lever 61 (FIG. 3) through the lever 60 (FIG. 3) that is arranged to be rotated along with the lever 58. The upwardly bent portion 55" of the cam plate 55 is fitted to the pin 62 on the lever 34, and is interlocked to the optical system of the finder. On the other hand, the shaft 57 is provided on the camera fixed portion. The position of the shaft 57 is selected by choosing the point wherein the movement of the shaft 59 of the moving lever 56 becomes almost constant against the respective exchange lenses at the time when the photographing distance is varied after mounting the exchange lenses of different focal length, as is discussed thereinafter.

Element 63 is an auxiliary spring which presses one of the cam plates 54 to the right, and element 64 is an auxiliary spring which presses the other cam plate 55 to the left. Sometimes they can be omitted. A lever 65 is rotated along with the roller lever 67 by the shaft 66, and is interlocked to the intermediate lever 61 through the pin 68 which is fixed at one end thereof. The arcuate cam 69 which is provided on the other end of the lever 65 is interlocked to the distance-measuring lever 10 through the lever 70 supported by the shaft 11. By means of the spring 71 the lever 65 is interlocked to the distance-measuring lever 10, and is urged in the direction in which the roller 72 on the roller lever 67 abuts the mount portion.

The direction of the force exerted by the drive springs 48 and 49 and the direction in which the respective cam plates 54, 55 abut to the moving lever 56, are relative. Therefore it is possible to make an arrangement in the opposite relation to that of the embodiment illustrated in the drawing.

Generally speaking, in a rangefinder type camera, when the photographing distance is set to be R and the distance between the center of the finder and the center of the camera lens, is set to be $a$, the following relation as is represented by the general formula given below can be obtained between these values and the angle $\theta$ by which the axis of finder view must be tilted.

$$\tan \theta = \frac{a}{R}$$

When this is calculated into an amount of movement $x_1$ in center of the view mask on the real image surface, the following relation can be obtained when the composite focal length of the optical system of the finder for making the real image, is set to be F.

$$x_1 = fF \tan \theta = fF \frac{a}{R}$$

Therefore in order to correct the parallax, the center of the view mask must be moved to the direction of the center of the camera lens by the amount of $x_1$. In case the magnification of the finder is greater, i.e., in case $fF$ is greater, the amount $x_1$ becomes greater.

Figure 8:
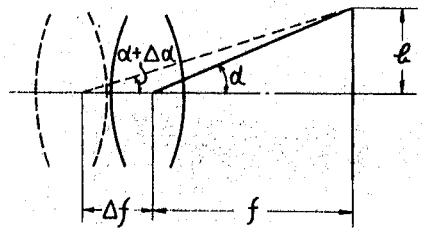
FIG. 8 is a diagram showing the change of the angle of view produced by the pulling out of the camera lens.

On the other hand, when the object in the neighborhood is photographed and the lens is pulled out, the angle of view $\alpha$ is changed along with the pulling operation of lens, and the amount of the change $\Delta\alpha$ (see FIG. 8) can be obtained by the following formula when half the length of the diagonal line of the view is set up to be $b$, when the focal length of the camera lens is set up to be $f$, and the amount of pulling out of lens is set up to be $\Delta f$, $$\Delta\alpha = -\frac{1}{\sec^2 \alpha} \cdot \frac{b}{f^2} \cdot \Delta f$$

$$\because \Delta f \approx \frac{f^2}{R-2f}$$

$$\therefore \Delta\alpha \approx -\frac{f^2}{(f^2+b^2)} \cdot \frac{b}{(R-2f)}$$

In case this is calculated in an amount of the movement $x_2$ of the center of the view mask on the real image surface, the following relation can be obtained.

$$x_2 = fF \cdot \Delta\alpha$$

Therefor in order to correct the change of angle of view, the amount $x_2$ is corrected in the direction of the diagonal line of the view mask and thus the size of the mask must be changed.

In the present invention, it is so arranged that the finder magnification is small and the size of view mask is large against a lens having a shorter $f$. With a lens having a longer $f$ the finder magnification is large and the size of the view mask is small. $\Delta\alpha$ becomes larger as $f$ becomes larger, and therefore $x_2$ becomes larger as $fF$ becomes larger.

In other words, in the finder having the structure as in the case of the present invention, when the view mask is reduced, it is necessary to provide a greater correction of parallax and a greater angle of view (vector sum of $x_1$ and $x_2$) against the photographing distance signal of the same amount coming from the focussing mechanism.

However, among the four sides which form the view mask, the two sides near of the light axis of the camera lens, are moved to the side of light axis of camera lens by the correction of parallax. However by means of the correction of the angle of view generated at this time, it is turned back to the center of the finder, and therefore the positions of the said two sides are substantially not changed in carrying out the correction. In other words, the vector sum of $x_1$ and $x_2$ at that point is remarkably small, and it is possible to approximately fix the same. The present invention has been made from this point of view, and the correction in regard to the change of the focal length of the mounted lens, is carried out by moving the two masks 26, 27 but the correction of parallax and the angle of view can be carried out by moving only one of the masks.

Figure 9:
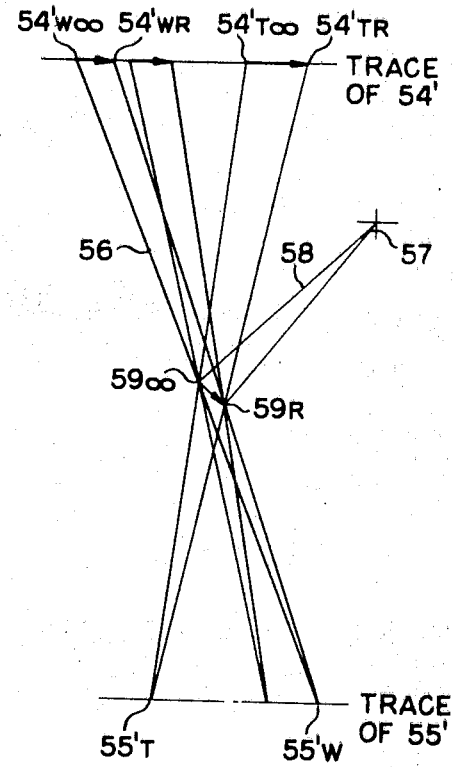
FIG. 9 is a diagram showing the principle of the present invention.

In FIG. 9, 55′w stands for the position of the portion 55′ in case of a certain short focal length lens $f_w$ and the position 55′T stands for the position of the portion 55′ when the lens of longer focal length $fT$ is fitted 54′w  is the position of the contacting portion 54 ′ against the lens $f_w$ when it is adjusted in the infinite, and 54′T  is the position of the fitting portion 54′ against the lens $fT$ when it is adjusted to be in the infinite.

$$\overline{(54'W\infty)(54'WR)}$$

stands for the amount of movement of the necessary cam plate 54 required for giving the movement of $(x_1 + x_2)$ to the mask 26 as is calculated against any optical distance R when the lens of $fW$ is mounted.

$$\overline{(54'T\infty)(54'TR)}$$

is the amount of the movement calculated against $fT$ in the same manner. Since the photographing distance signal obtained through the levers 60, 58 is the same against the lenses of any focal length, the obtained value is changed into the specific values for the respective lenses ($fW$) ($fT$ and must be given to the cam plates. For this purpose, the procedures given above are carried out for all lenses and the photographing distances. The transition trace (59**–59R) of the rotation center of the moving lever 56 is selected, and so as to attain the same, the position of the shaft 57 is selected.

Figure 1:
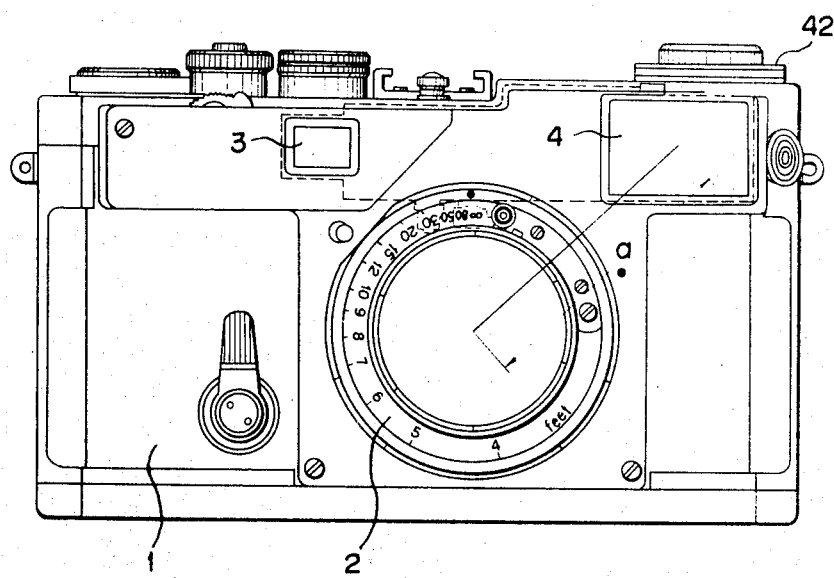
FIG. 1 is a front elevational view of a camera having the rangefinder of the present invention.
Figure 2:
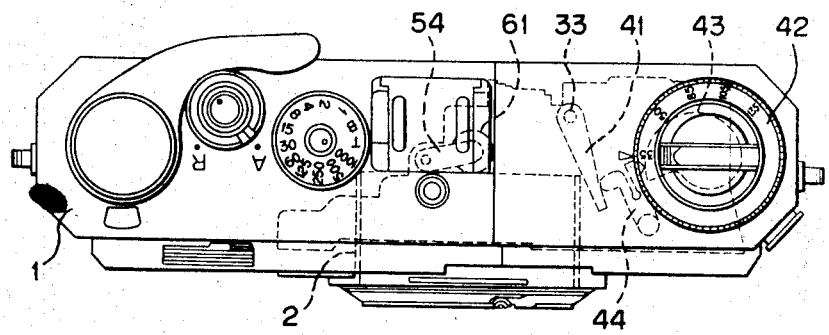
FIG. 2 is a top plan view of FIG. 1.

The structure of the device of this invention is as mentioned above, and when the focal length of the mounted lens is selected by rotating the dial 42 from the position of FIG. 2 in the counterclock direction, then the operation thereof is transmitted to the lever 34 through the cam 43, the levers 44, and 41, to move the magnifying system 16, 17 and 18 in the direction shown by the arrow while keeping a definite relation between the magnifying systems 16, 17, and 18. At this time, the relation between the respective members in the transmission path can be retained by means of the force of the spring operating on the magnifying system.

On the other hand, when the lever 34 is rotated, by the contacting of the pin 62 on the lever 34 and the bent portion 55″ of one cam plate 55, the two masks 26, 27 are diagonally moved by means of the force of the respective springs 48 and 49 and the auxiliary springs 63, and 64 to form the view mask of a predetermined size.

Next, when the lens mount portion 2 is moved for pulling out the lens, the roller 72 follows by means of the force of the spring 71 transmitted through the cams 67, 69 and 70, and the movement thereof is transmitted to the distance measuring lever 10 to move the lenses 6, 7. Therefore the distance can be adjusted by means of the coincidence of double image. At this time the lever 60 follows the lever 61 by means of the force of the springs 48, 63 and 64, and therefore the lever 56 is also moved with the fitting portion 55′ of one cam plate 55, as the fulcrum, which is being stopped. Thus the other cam plate 54 alone is moved to carryout the correction of parallax and the angle of view.

As mentioned above, when the present invention is employed, it is possible to carryout the correction of parallax and the angle of view to such a degree there is no trouble from the practical point of view by appropriately selecting the trace of the rotary shaft of the rocking lever. Therefore, when compared with the conventional devices, the structure of the device of the present invention can be operated correctly and the structure of the present device is much simpler.

I claim:

1. A viewfinder for a camera of the interchangeable lens type, said viewfinder comprising: an optical system including a varifocal objective lens and an eyepiece, the magnification of said optical system being adjustable; means for selecting the magnification of said optical system in accordance with the focal length of the selected camera lens; a fixed support having a base plate placed at the focal plane of said objective lens; a pair of masks on said base plate defining the field of view and being movable relative to said fixed support towards and away from each other to vary the size of the field of view, one of said masks being interconnected to said selecting means and moved thereby; a pivot member mounted on said fixed support and displaced relative thereto in response to focusing of the camera lens; and a lever mounted at a position intermediate its ends upon said pivot member and coupled to said respective masks at opposite sides of said position, said lever being arranged to pivot, in accordance with the movement of one of said masks, about said pivot member without displacement thereof so that said two masks are moved simultaneously to select the size of the field of view according to selected magnification, and to pivot in response to focusing of the camera lens about the coupling thereof to one of the masks to move only the other of said masks to correct for parallax and varying angle of view of the selected camera lens while said one mask remains substantially stationary, whereby the path of displacement of said pivot member is so disposed that the rate of movement of said other mask relative to the displacement of said pivot member varies according to the selected size of the field of view to compensate for different degrees of correction for parallax and varying angle of view required by the camera lenses of different focal length.

2. A viewfinder according to claim 1, wherein said fixed support further includes a shaft rotatable in response to focusing of the camera lens and an arm carried on said shaft, said pivot member being mounted on the end of said arm.

3. A viewfinder according to claim 1, wherein said fixed support further includes a guide rod secured thereto and extending in the direction in which said masks are to move, each of said said masks being provided with a V-shaped groove, which grooves slidably embrace said guide rod.

4. A viewfinder according to claim 3, wherein said fixed support further comprises a pair of couplers connected to said lever and slidably mounted on said base plate, the first coupler engaging said one mask and being connected to said selecting means, the second coupler engaging to said other mask, whereby said two masks are moved through said respective couplers.